(No Model.)

J. J. VARLEY.
MANUFACTURE OF SCREW STOPPERS.

No. 527,517. Patented Oct. 16, 1894.

Witnesses.
J. M. Pond.
G. M. Copenhaver.

Inventor.
John James Varley
by John J. Halsted & Son
his Attys.

UNITED STATES PATENT OFFICE.

JOHN JAMES VARLEY, OF LONDON, ENGLAND.

MANUFACTURE OF SCREW-STOPPERS.

SPECIFICATION forming part of Letters Patent No. 527,517, dated October 16, 1894.

Application filed February 27, 1894. Serial No. 501,723. (No specimens.) Patented in Canada December 9, 1892, No. 41,126, and in England January 11, 1893, No. 649.

*To all whom it may concern:*

Be it known that I, JOHN JAMES VARLEY, a subject of the Queen of Great Britain, residing at Merton, London, in the county of Surrey, England, have invented new and useful Improvements in the Manufacture of Screw-Stoppers, (for part of which I have obtained patents in Canada, No. 41,126, dated December 9, 1892, and in Great Britain, No. 649, dated January 11, 1893,) of which the following is a specification.

This invention relates to improvements in the manufacture of screw-stoppers for stoppering bottles, jars and other vessels, the object of the invention being to provide a stopper which is more suitable for some branches of the bottling trade, that is to say, a stopper which is specially adapted for use in cases where the contents of the bottle have to be heated or steamed as in the case of lager beer, jams, preserves, meats and the like. Hitherto such stoppers have generally been made of composition or of vulcanite but in some cases they have been made of wood. Stoppers made from the two former materials soften under the influence of heat and are thus rendered practically useless while stoppers made from wood alone have many objections inasmuch as that the wood will swell and shrink under different conditions and the stoppers thus become unserviceable. They are also very liable to become foul. For example in many cases fungi will form thereon which may be injurious to health.

According to my improvements in the manufacture of screw-stoppers I am enabled to produce a screw-stopper in which the above defects or objections are obviated.

Figure 1:
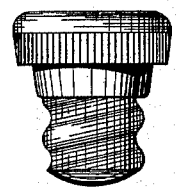
Figure 2:
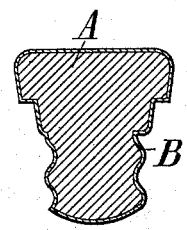

In the accompanying drawings, Figure 1 is an elevation of the stopper, and Fig. 2 is a vertical section of the same.

A is the wooden core, which is impregnated and treated as hereinafter described; and B is the coating of enamel upon the core.

In carrying out my invention I first form by suitable machinery a screw-stopper A from a piece of wood preferably from soft wood such as American birch, which wood I find very suitable although other wood may be used. I then immerse the stopper in a solution of suitable gum such as gum sandarach, gum amber, shellac or the like which I place in a vessel constructed to allow of pressure being applied to the contents of the vessel, whereby the wood stopper A becomes impregnated with the solution of gum thereby rendering the stopper perfectly impervious so that neither moisture nor gases can pass through the stopper. The stoppers so impregnated are stoved or baked to dry and harden the gum and are then coated with a suitable enamel B, that is to say, with an enamel which will not be affected by the contents of the bottle to be stoppered and are then again stoved or baked. By these means I produce a screw-stopper of wood which will effectually seal a bottle and which can be used for stoppering all bottles or vessels the contents of which have to be pasteurized, sterilized, steamed or heated as well as for ordinary stoppering purposes.

My stoppers also possess the advantage of being clean and durable and have a highly finished appearance.

Having now particularly described and ascertained the nature of my said invention and in what manner the same is to be performed, I declare that what I claim is—

1. The improved method of making screw stoppers, consisting in first making the desired form from a piece of wood, next impregnating said wooden form with a solution of gum under pressure, next stoving said impregnated form, and then coating the same with enamel, all as and for the purposes set forth.

2. The improved method of making screw stoppers, consisting in first making the desired form from a piece of wood, next impregnating said wooden form under pressure with a solution of gum, next stoving said impregnated form, next coating the same with enamel, and finally stoving the enameled product, all as and for the purposes set forth.

JOHN JAMES VARLEY.

Witnesses:
G. F. REDFERN,
JOHN E. BOUSFIELD,
*Of the firm of G. F. Redfern & Co., 4 South Street, Finsbury, London, Patent Agents.*